US009479999B2

(12) United States Patent
Zhang et al.

(10) Patent No.: US 9,479,999 B2
(45) Date of Patent: Oct. 25, 2016

(54) VEHICULAR COMMUNICATION METHOD, DEVICE AND SYSTEM

(71) Applicant: Huawei Technologies Co., LTD., Shenzhen (CN)

(72) Inventors: Jun Zhang, Kowloon (HK); Jiannong Cao, Kowloon (HK); Yonggang Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 14/309,444

(22) Filed: Jun. 19, 2014

(65) Prior Publication Data

US 2014/0321380 A1 Oct. 30, 2014

Related U.S. Application Data

(63) Continuation of application No. PCT/CN2012/075774, filed on May 19, 2012.

(30) Foreign Application Priority Data

Dec. 20, 2011 (CN) .......................... 2011 1 0430543

(51) Int. Cl.
*H04W 4/00* (2009.01)
*H04W 48/04* (2009.01)
(Continued)

(52) U.S. Cl.
CPC ............. *H04W 48/04* (2013.01); *H04W 48/16* (2013.01); *H04W 48/20* (2013.01)

(58) Field of Classification Search
CPC ........................... H04W 48/04; H04W 48/16
See application file for complete search history.

(56) References Cited

U.S. PATENT DOCUMENTS 6,345,186 B1  2/2002  Schultz et al.

7,768,981 B1  8/2010  Donovan et al.
(Continued)

FOREIGN PATENT DOCUMENTS

CN       1335024 A     2/2002
CN   101605332 A   12/2009
(Continued)

OTHER PUBLICATIONS

Kandula et al., "FatVAP: Aggregating AP Backhaul Capacity to Maximize Throughput" NSDI '08:5th USENIX Symposium on Networked Systems Design and Implementation Usenix Association, 2008, 15 pages.*

(Continued)

*Primary Examiner* — Derrick Ferris
*Assistant Examiner* — Farhad Ali
(74) *Attorney, Agent, or Firm* — Brinks Gilson & Lione (57) ABSTRACT

Embodiments of the present invention disclose a vehicular communication method, including: acquiring a current position of a vehicle; acquiring all fixed APs, the distance from each of which to the current position of the vehicle is smaller than its maximum transmission distance; scanning all the fixed APs in a scheduling period; selecting at least one fixed AP of which signal strength is greater than a preset value in all the fixed APs as a to-be-accessed fixed AP according to the scanning results; and triggering a mobile terminal in the vehicle to respectively access a vehicular AP in the vehicle and the to-be-accessed fixed AP in the scheduling period according to allocated time when an access condition is satisfied. The embodiments of the present invention further disclose a vehicular communication device and system. Through the above technical solutions, the communication bandwidth is increased and bulk data service is supported.

16 Claims, 2 Drawing Sheets

(51) Int. Cl.
*H04W 48/20* (2009.01)
*H04W 48/16* (2009.01)

(56) References Cited

U.S. PATENT DOCUMENTS

| | | | |
|---|---|---|---|
| 2002/0002045 | A1 | 1/2002 | Aoki et al. |
| 2008/0227434 | A1* | 9/2008 | Nitta ................ H04B 7/18506 455/414.1 |
| 2010/0008291 | A1* | 1/2010 | LeBlanc ................ H04L 45/24 370/328 |
| 2010/0142504 | A1 | 6/2010 | Bitran et al. |
| 2011/0164562 | A1* | 7/2011 | Qiu ................ H04W 72/1236 370/328 |
| 2012/0058763 | A1 | 3/2012 | Zhao |

FOREIGN PATENT DOCUMENTS

| | | |
|---|---|---|
| CN | 101610553 A | 12/2009 |
| CN | 101917749 A | 12/2010 |
| CN | 101977423 A | 2/2011 |
| CN | 102118813 A | 7/2011 |
| WO | WO 2006/100714 A1 | 9/2006 |
| WO | WO 2010/099658 A1 | 9/2010 |
| WO | WO 2010/133040 A1 | 11/2010 |

OTHER PUBLICATIONS

Kandula et al., "FatVAP: Aggregating AP Backhaul Capacity to Maximize Throughput" NSDI '08: 5$^{th}$ USENIX Symposium on Networked Systems Design and Implementation Usenix Association, 2008, 15 pages.

Chandra et al., "MultiNet: Connecting to Multiple IEEE 802.11 Networks Using a Single Wireless Card" Powerpoint Presentation, Cornell University and Microsoft Corp., 2004, 18 pages.

IEEE Standard for Information technology—Telecommunications and information exchange between systems—Local and metropolitan area networks—Specific requirements, "Part 11: Wireless LAN Medium Access Control (MAC) and Physical Layer (PHY) Specifications, Amendment 5: Enhancements for Higher Throughput" IEEE Computer Society 802.11n™ Oct. 29, 2009, 536 pages.

Chandra et al., "MultiNet: Connecting to Multiple IEEE 802.11 Networks Using a Single Wireless Card" IEEE 2004, pp. 882-893.

* cited by examiner

Fig.4

VEHICULAR COMMUNICATION METHOD, DEVICE AND SYSTEM

CROSS-REFERENCE TO RELATED APPLICATIONS

This application is a continuation of International Application No. PCT/CN2012/075774, filed on May 19, 2012, which claims priority to Chinese Patent Application No. 201110430543.3, filed on Dec. 20, 2011, both of which are hereby incorporated by reference in their entireties.

TECHNICAL FIELD

The present invention relates to the field of communications, and particularly, relates to a vehicular communication method, device and system.

BACKGROUND

With the development of wireless technology and handheld devices, more and more users use various internet services during communication. A bus in a city has the characteristics of fixed lines, large passenger flow and the like. Moreover, a solution of a wireless city is pushed in many cities nowadays, and access points of a WLAN (Wireless Local Area Network, wireless local area network) are arranged on two sides of many roads, such as a telephone booth.

At present, an operator has paid attention to vehicular communication. In Hong Kong, PCCW (Pacific Century Cyber Works Limited, Pacific Century Cyber Works Limited) has deployed vehicular communication systems on multiple lines. An access device is deployed in a bus, wireless coverage in the bus is implemented by using a WLAN technology, and a base station is connected for a backhaul link by using a cellular technology. A user on the bus is connected to the vehicular communication access device by using the WLAN access technology to use a service such as internet browsing or the like. At present, in terms of rate, although a WLAN may provide a relatively high access rate, for example, the highest wireless data rate of the WLAN 802.11n may reach 600 Mbps, a rate supported by a current cellular network (3G) is only several Mbps to more than ten Mbps compared to the WLAN technology, for example, a theoretical rate of Unicom WCDMA is 14.4 Mbps.

Therefore, a communication bandwidth of a user is currently limited by a bandwidth of a backhaul link in a vehicular communication environment. When many users surf the internet through a vehicular access device, a bandwidth obtained by each user is very small which can not support a high-speed data service, such as a multimedia service or the like, due to a narrower bandwidth of a cellular network.

SUMMARY

The objective of embodiments of the present invention is to provide a vehicular communication method, device and system based on a wireless multi-connection in a vehicular environment, which increases the bandwidth when a user on a bus surfs the internet through a vehicular access device to support bulk data service.

An embodiment of the present invention provides a vehicular communication method, including:
  acquiring a current position of a vehicle;
  acquiring all fixed access points (AP) satisfying a condition outside the vehicle according to the current position of the vehicle, wherein the fixed AP satisfying the condition is the one, the distance from which to the current position of the vehicle is smaller than the fixed AP's own maximum transmission distance;
  scanning all the fixed APs satisfying the condition in a scheduling period;
  selecting at least one fixed AP of which signal strength is greater than a preset value in all the fixed APs satisfying the condition as a to-be-accessed fixed AP, according to the scanning results;
  triggering a mobile terminal in the vehicle to respectively access a vehicular AP in the vehicle and the to-be-accessed fixed AP in the scheduling period according to allocated time when a preset access condition is satisfied.

An embodiment of the present invention further provides a vehicular communication device, including:
  a first acquiring unit, configured to acquire a current position of a vehicle;
  a second acquiring unit, configured to acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
  a scanning unit, configured to scan all the fixed APs satisfying the condition in a scheduling period;
  a selecting unit, configured to select at least one fixed AP of which signal strength is greater than a preset value in all the fixed APs satisfying the condition as a to-be-accessed fixed AP, according to the scanning results;
  a triggering unit, configured to trigger a mobile terminal in the vehicle to respectively access a vehicular AP in the vehicle and the to-be-accessed fixed AP in the scheduling period according to allocated time, when a preset access condition is satisfied.

An embodiment of the present invention further provides a vehicular communication system, including a vehicular communication device and a vehicular AP which are arranged in a vehicle; wherein,
  the vehicular communication device is configured to:
  acquire a current position of the vehicle;
  acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
  scan all the fixed APs satisfying the condition in a scheduling period; select at least one fixed AP of which signal strength is greater than a preset value in all the fixed APs satisfying the condition as a to-be-accessed fixed AP according to the scanning results;
  trigger a mobile terminal in the vehicle to respectively access the vehicular AP and the to-be-accessed fixed AP in the scheduling period according to allocated time, when a preset access condition is satisfied.

Through the above technical solutions in the embodiments of the present invention, a fixed AP with relatively high signal strength is selected by scanning fixed APs nearby a vehicle during the running of the vehicle, and a UE in the vehicle is triggered to access a vehicular AP and the selected fixed AP with relatively high signal strength according to allocated time when an access condition is satisfied. Because the fixed AP can provide a higher data transmission rate compared to the vehicular AP, the communication bandwidth of the user in the vehicle can be increased to support bulk data service.

BRIEF DESCRIPTION OF DRAWINGS

To illustrate technical solutions in embodiments of the present invention or in the prior art more clearly, a brief introduction on accompanying drawings which are needed in the description of the embodiments or the prior art will be given below. Apparently, the accompanying drawings described below are merely some of the embodiments of the present invention, based on which other drawings may be obtained by those skilled in the art without any inventive efforts.

DESCRIPTION OF EMBODIMENTS

A clear and complete description of technical solutions of the embodiments of the present invention will be given below in conjunction with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

To make those skilled in the art better understand the technical solutions provided by the embodiments of the present invention, a simple introduction is made to an application scenario of the embodiments of the present invention.

Figure 1:
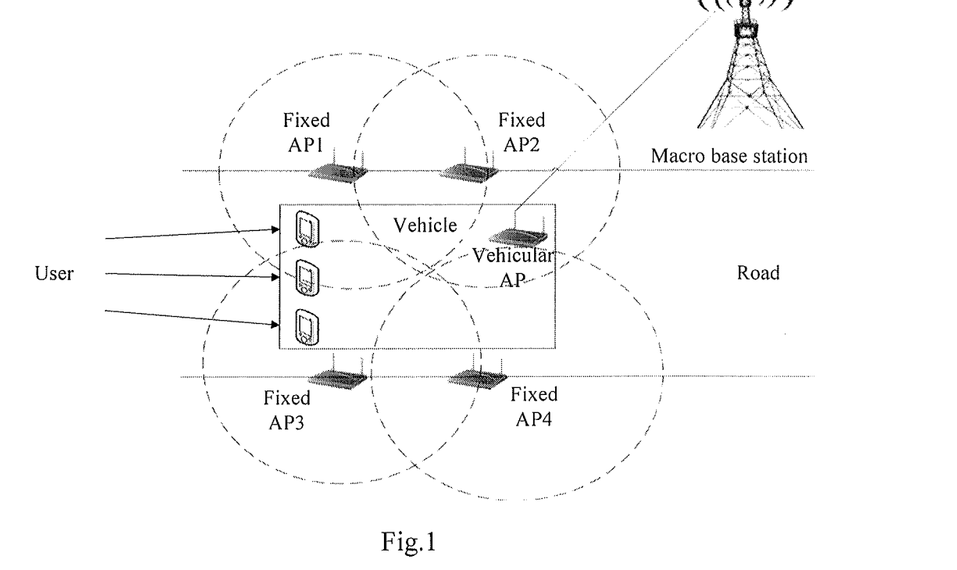
FIG. 1 is a schematic diagram of an application scenario of an embodiment of the present invention.

FIG. 1 shows a typical application scenario of an embodiment of the present invention. According to FIG. 1, multiple users are located in a mobile bus carrying a vehicular AP (Access point, access point), and the vehicular AP supports a WLAN access technology and a cellular network access technology. For convenience of description, in the embodiments of the present invention, the WLAN access technology is described by taking an IEEE 802.11n technology as an example, and the cellular network access technology is described by using a WCDMA access technology as an example. A handheld device of the user supports IEEE 802.11n which may access the vehicular AP, and the vehicular AP communicates with a WCDMA macro base station by using the WCDMA access technology. The handheld device of the user supports a multi-connection, and may be simultaneously connected to multiple WALN access devices. A GPS on the bus may measure a position and a running speed of the bus, and the vehicular AP may use the two pieces of information. Meanwhile, a running line of the bus is fixed, and many fixed APs are arranged nearby the bus line. These fixed APs may be WiFi telephone booths with a WLAN access function or other access devices supporting a cellular access function. The user on the bus may be connected to the fixed APs nearby the bus line based on an access device of the terminal.

In addition, parameters of the embodiments of the present invention are defined as follows:

D is a scheduling period, namely a user may schedule and allocate time in which different APs are connected and time in which channel scanning is performed in each unit time slice D. In the embodiments of the present invention, it is set that D=400 ms. One scheduling period D is divided into 20 sub-timeslices, and the length of each sub-timeslice d is 20 ms.

Figure 2:
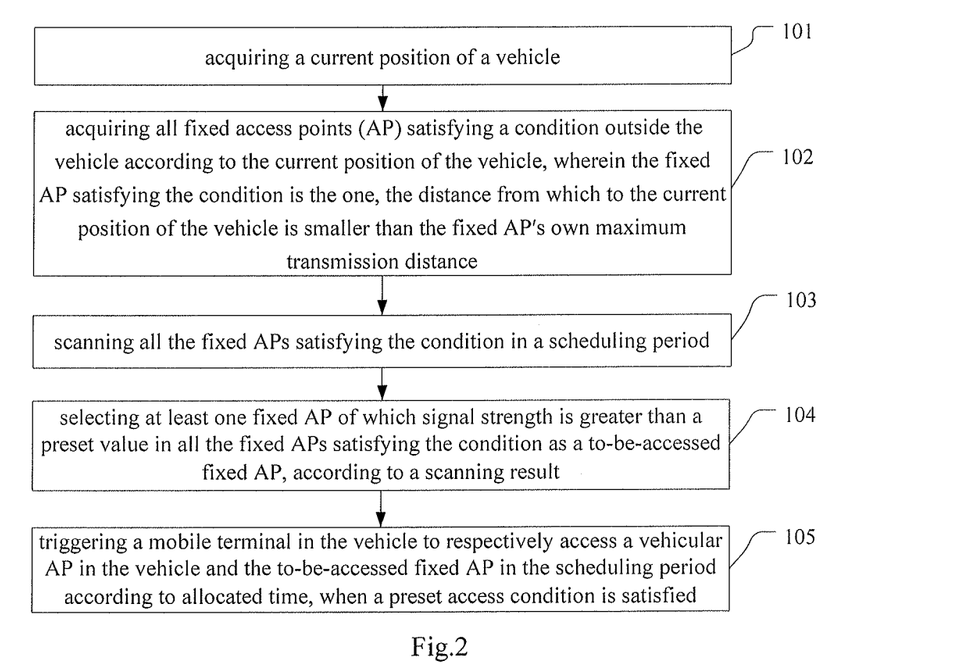
FIG. 2 is a flow diagram of a vehicular communication method provided by an embodiment of the present invention.

As shown in FIG. 2, an embodiment of the present invention provides a vehicular communication method based on a wireless multi-connection. The method is applied in the scenario shown in FIG. 1. The method includes:

step 101, a current position of a vehicle is acquired;

it should be noted that the current position of the vehicle may be acquired through a GPS (Global Positioning System, global positioning system) arranged in the vehicle.

Step 102, all fixed APs satisfying a condition outside the vehicle are acquired according to the current position of the vehicle, wherein the fixed AP satisfying the condition is the one, the distance from which to the current position of the vehicle is smaller than the fixed AP's own maximum transmission distance;

specifically, in an embodiment, all the fixed APs satisfying the condition may be acquired in a querying manner: a fixed AP database is pre-established based on statistics of APs nearby a bus line, wherein, the database records a corresponding relationship between each position interval and all fixed APs (all the fixed APs capable of covering the current position interval), the distance from each of which to the position interval is smaller than its maximum transmission distance, and the position interval is obtained by dividing the whole bus line into a plurality of regions; and then a vehicular AP makes the current position correspond to a position interval of the bus line according to current position information acquired by a GPS on the bus, and acquires all the fixed APs satisfying the condition by querying the pre-established fixed AP database. It should be noted that, a maximum transmission distance of a fixed AP is generally 50 m, 100 m, 150 m, 200 m or 300 m, and is specifically determined according to transmission power and a surrounding environment of the AP. It should be understood that a maximum transmission distance of an AP is longer in an open environment without obstacles compared with an indoor environment or an environment with an obstacle. In addition, in a same environment, the higher transmission power of the AP is, the longer the maximum transmission distance of the AP is.

In another embodiment, the fixed APs satisfying the condition may also be obtained by summarizing historic records of fixed APs satisfying the condition previously scanned by the vehicular AP at the position interval.

In another embodiment, the fixed APs satisfying the condition may be detected by a signal detection device of the vehicular AP in real time. Specifically, the signal detection device of the vehicular AP broadcasts a detection request message around and may learn that distances between which fixed AP and the current position of the vehicle is smaller than its own maximum transmission distances according to a received response signal, thus obtaining all the fixed APs satisfying the condition.

Step 103, all the fixed APs satisfying the condition are scanned in a scheduling period;

specifically, taking the scheduling period as a unit, a process of scanning the fixed APs satisfying the condition is as follows: the vehicular AP successively sends a detection request message to all the acquired fixed APs satisfying the condition, and records received response signal strength of each AP, i.e. an RSSI (Received Signal Strength Indication, received signal strength indication) value (unit: dbm); and if a response signal of a certain AP is not received, an RSSI of the AP is recorded as zero.

Step 104, according to the scanning results, at least one fixed AP of which signal strength is greater than a preset value in all the fixed APs satisfying the condition is selected as a to-be-accessed fixed AP;

in an embodiment, after all the fixed APs satisfying the condition are scanned once, an AP with a largest RSSI is selected as a to-be-accessed fixed AP; in another embodiment, after all the fixed APs satisfying the condition are scanned once, RSSI values of all the fixed APs satisfying the condition are sorted from big to small, and k (k is a positive integer) fixed APs of which RSSIs are greater than a preset value are used as to-be-accessed fixed APs.

Further, to improve the accuracy of the scanning and the selection, in another embodiment, all the fixed APs satisfying the condition may be scanned for multiple times, such as three times, using multiple sub-timeslices in one scheduling period, an RSSI of each fixed AP in each scanning process is recorded, and a fixed AP with a maximum average RSSI value (average of three times) is used as a to-be-accessed fixed AP after three times of scanning. In another embodiment, k (k is a positive integer) fixed APs with maximum average RSSI values may also be selected as to-be-accessed fixed APs.

Step 105, when a preset access condition is satisfied, a mobile terminal in the vehicle is triggered to respectively access the vehicular AP and the to-be-accessed fixed AP in the scheduling period according to allocated time.

It should be noted that the mobile terminal may be a user equipment (User Equipment, UE for short below), a mobile relay or the like; and the UE may be a mobile phone, a personal computer or the like. The UE is taken as an example for illustration in the embodiments of the present invention, but is not used for limiting the protection scope of the mobile terminal.

In an embodiment, according to a current speed, the vehicular AP triggers the mobile terminal in the vehicle to respectively access the vehicular AP and the to-be-accessed fixed AP in the scheduling period according to the allocated time. Specifically, it is assumed that a previously selected access AP is expressed as $AP_{best}$ according to the scanning result. The vehicular AP detects and acquires measurement information of a current speed provided by a vehicular GPS. If the current speed is smaller than a preset speed value VL (for example, VL=2 m/s), the vehicular AP broadcasts the device name $AP_{best}$ of the to-be-accessed fixed AP selected in the step 102 to a UE in the vehicle using one sub-timeslice (if multiple to-be-accessed fixed APs are selected in the step 102, the vehicular AP broadcasts a device name list $AP_{best}$ of the selected multiple to-be-accessed fixed APs to the UE in the vehicle). After the UE on the bus receives the $AP_{best}$ broadcasted by the vehicular AP, the UE respectively accesses the vehicular AP and the to-be-accessed fixed AP in the scheduling period according to the allocated time.

It should be noted that different APs are accessed respectively according to the allocated time in one scheduling period, which is substantially a specific application of the WLAN multi-connection technology. To make those skilled in the art better understand the technical solutions of the embodiments of the present invention, a simple introduction will be made to the WLAN multi-connection technology below.

In 2004, a paper "Multinet: connecting to multiple ieee 802.11 networks using a single wireless card, in Proc. IEEE INFOCOM, 2004" published by Microsoft proposed a concept of using multiple virtual wireless network cards to connect multiple APs in parallel for the first time and made a practical prototype multinet. The principle of the multinet mechanism is to add a middleware between an IP layer and an MAC layer and simulate multiple virtual network cards on one network card on the middleware. From an upper layer to an application layer, the device has only one IP address; and for a lower layer, each virtual network card has an independent IP address, so that a multi-connection objective is fulfilled.

Based on this, a document "Fatvap: Aggregating ap backhaul bandwidth," proposed an optimization of data transmission time when the terminal camps on each AP under the WLAN multi-connection condition. The optimized solution is based on a dynamic planning method, in which each user may optimize and configure time to access each AP, so that time proportion of accessing each AP is not more than $e_i/w_i$, where, $e_i$ is a wired bandwidth of the AP, $w_i$ is a wireless bandwidth of the AP. The objective of the optimization configuration is to maximize the throughput of the user.

It should be noted that the allocated time in the embodiments of the present invention indicates time allocated to the vehicular AP and time allocated to the to-be-accessed fixed AP. In an embodiment, the allocated time may be preset time. For example, in one scheduling period D (400 ms), the time allocated to the vehicular AP may be preset as 100 ms, and the time allocated to the to-be-accessed fixed AP is 300 ms.

In another embodiment, the allocated time may be calculated according to a preset scheduling strategy. Specifically, when there is one to-be-accessed fixed AP, it is assumed that the vehicular AP is $AP_c$ and an AP in the $AP_{best}$ is $AP_g$, and a method for calculating time in which the UE is connected to the $AP_c$ and the $AP_g$ is as follows:

In one scheduling period, it is assumed that the time allocated to the vehicular AP $AP_c$ is $f_c$ and the time allocated to the to-be-accessed fixed AP $AP_g$ is $f_g$. Scheduling formulae that the user is connected to the $AP_c$ and the $AP_g$ are:

$$f_c + f_g = 1 - 2d/D - \varepsilon \quad \text{(Formula 1)}$$

$$\frac{f_g}{f_c} = (RSS_g - RSS_0)^\alpha \times \lambda \quad \text{(Formula 2)}$$

Where, $\varepsilon$ is handover time in which the UE is handed over between different APs. Handover time of a UE is generally about 4 ms. $RSS_g$ is an RSSI of the $AP_g$. It should be noted that, in an embodiment, the RSSI of the to-be-accessed fixed AP $AP_g$ may be the one recorded in the scanning process of step 102; and in another embodiment, to acquire a current RSSI of the to-be-accessed fixed AP $AP_g$ more accurately so as to formulate a more accurate scheduling solution, a UE on the bus may actively scan an AP in the $AP_{best}$ using one sub-timeslice to acquire a current RSSI of the AP in the $AP_{best}$ after receiving the $AP_{best}$ broadcasted by the vehicular AP, and calculates the time allocated to the vehicular AP $AP_c$ and the to-be-accessed fixed AP $AP_g$ using the RSSI.

RSS$_0$ is a threshold value, and −95 dbm is suggested. If the RSS$_g$ is below the RSS$_0$ value, it is meant that the signal of the to-be-accessed fixed AP is very weak, and is not enough to keep high-speed connection. α is a system parameter for controlling whether more connection time is allocated to the fixed AP, and a value between 0.5 and 2 is suggested. λ is a weight having a value between 0 to 1, and the weight may be dynamically adjusted according to the speed or signal strength of a data packet received by the vehicular AP. For example, in an embodiment, the weight $$\lambda = \frac{V_L - V}{V_L},$$

where, V is a current running speed of the bus, V$_L$ is a set speed threshold having a typical value of 2 m/s. Thus, the value of the λ may be determined according to the speed, namely the lower the speed is, the larger the weight λ is, and when the speed is zero, namely the vehicle stops, the weight is the maximum 1; when the speed V is equal to the V$_L$, a theoretical value of the weight λ is 0, but the weight does not have a practical significance, therefore, the λ may be assigned as a specific value under such a special situation, such as 0.01. It should be understood that, in another embodiment, the λ may also be determined according to signal strength of a data packet currently received by the vehicular AP, and the higher the signal strength of the data packet currently received by the vehicular AP is, the larger the λ is, and if the signal strength of the data packet currently received by the vehicular AP is 100%, the λ is 1.

It should be noted that, one scheduling period is assumed as 400 ms in the embodiments of the present invention, the UE configures the time to access the vehicular AP and the to-be-accessed fixed AP according to the calculated time $f_c$ and $f_g$ in one scheduling period, and respectively accesses the vehicular AP and the to-be-accessed fixed AP in one scheduling period according to the configured time.

The objective of allocating the time herein is that, a user allocates more time to connect the to-be-accessed fixed AP to increase the throughput when the bus is relatively close to the to-be-accessed fixed AP and the speed is relatively low; and when the bus starts running, the user starts moving away from the to-be-accessed fixed AP, the connection bandwidth with the AP declines, and the connection time with the AP is reduced at this moment, so that shorter interruption time (i.e. $f_c$*D) of the connection can be ensured when the user is disconnected from the AP.

In another embodiment, when there are multiple to-be-accessed fixed APs, namely when the AP$_{best}$ includes k (k is a positive integer and k>1) APs, it is assumed that the k APs included in the AP$_{best}$ are successively AP$_{g1}$, AP$_{g2}$, ..., AP$_{gk}$, and it is assumed that time allocated to the vehicular AP AP$_c$ is $f_c$ and time allocated to the to-be-accessed fixed APs is $f_{g1}$, $f_{g2}$, ..., $f_{gk}$ in one scheduling period. The formula 2 is calculated respectively for each of the to-be-accessed fixed APs in the AP$_{best}$ to obtain ratios $f_c$:$f_{g1}$, $f_c$:$f_{g2}$ ... $f_c$:$f_{gk}$ of the time allocated to the vehicular AP to the time allocated to the to-be-accessed fixed APs, and finally, each ratio is substituted into formula (3).

$$f_c + \sum_{i=1}^{k} f_{gi} = 1 - 2d/D - \varepsilon \quad \text{(Formula 3)}$$

The time allocated to the vehicular AP AP$_c$ and the time $f_{g1}$, $f_{g2}$ ... $f_{gk}$ allocated to the k to-be-accessed fixed APs AP$_{g1}$, AP$_{g2}$, ..., AP$_{gk}$ are calculated.

It should be noted that, to make those skilled in the art fully understand the technical solutions provided by the embodiments of the present invention, the method that the vehicular AP triggers a UE in the vehicle to simultaneously connect to the vehicular AP and the to-be-accessed fixed AP according to the speed is described in detail by merely taking the speed serving as a triggering condition as an example in the embodiments of the present invention, but the speed serving as the triggering condition set no limitation to the technical solutions provided by the present invention. It should be understood that, in another embodiment, signal strength of a data packet received by the vehicular AP may be used as a triggering condition, to trigger a UE in the vehicle to respectively access the vehicular AP and the to-be-accessed fixed AP in the scheduling period according to the time. Specifically, it is assumed that a device name of a to-be-accessed fixed AP previously selected according to a scanning result is expressed as AP$_{best}$. Once the vehicular AP receives a data packet, the vehicular AP measures signal strength of the data packet. If the signal strength RSSI of the data packet is greater than a preset strength value RSS$_0$ (for example, RSS$_0$=−95 dbm), the vehicular AP broadcasts the device name AP$_{best}$ of the to-be-accessed fixed AP selected in the step 102, to a UE in the vehicle using one sub-timeslice. After the UE on the bus receives the AP$_{best}$ broadcasted by the vehicular AP, the UE respectively accesses the vehicular AP and the to-be-accessed fixed AP in the scheduling period according to the allocated time in a multi-connection manner. The time in which the UE is connected with the vehicular AP and the to-be-accessed fixed AP has been illustrated previously in detail, and is not described redundantly herein.

Through the above technical solutions in the embodiments of the present invention, a fixed AP with relatively high signal strength is selected by scanning fixed APs nearby a vehicle during the running of the vehicle, and a UE in the vehicle is triggered to access a vehicular AP and the selected fixed AP with relatively high signal strength according to allocated time when an access condition is satisfied. Because the fixed AP can provide a higher data transmission rate compared to the vehicular AP, the communication bandwidth of the user in the vehicle can be increased to support bulk data service.

Figure 3:
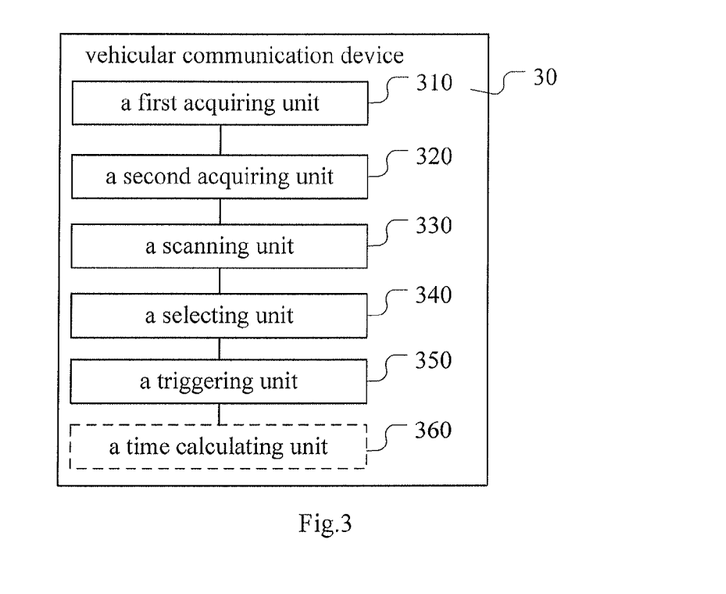
FIG. 3 is a schematic diagram of a vehicular communication device provided by an embodiment of the present invention.

As shown in FIG. 3, an embodiment of the present invention provides a vehicular communication device, including:

a first acquiring unit 310, configured to acquire a current position of a vehicle;

a second acquiring unit 320, configured to acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance.

In an embodiment, the second acquiring unit 320 acquires all the fixed APs satisfying the condition in a querying manner. Specifically, a fixed AP database is pre-established based on statistics of the APs nearby a bus line, wherein, the database records a corresponding relationship between each position interval on the bus line and all fixed APs (all the fixed APs capable of covering the current position interval), the distance from each of which to the position interval is smaller than its maximum transmission distance, and the position interval is obtained by dividing the whole bus line into a plurality of regions; and then the second acquiring unit 320 makes the current position correspond to a position interval on the bus line according to current position information acquired by a GPS on the bus, and the second acquiring unit 320 acquires all the fixed APs satisfying the condition by querying the pre-established fixed AP database. It should be noted that, a maximum transmission distance of a fixed AP is generally 50 m, 100 m, 150 m, 200 m or 300 m, and is specifically determined according to transmission power and a surrounding environment of the AP. It should be understood that a maximum transmission distance of an AP is longer in an open environment without obstacles compared with an indoor environment or an environment with an obstacle. In addition, in a same environment, the higher the transmission power of the AP is, the longer the maximum transmission distance of the AP is.

In another embodiment, the second acquiring unit 320 may also combine historic records of fixed APs satisfying the condition previously acquired at the position interval as all the fixed APs satisfying the condition.

In another embodiment, the second acquiring unit 320 may also obtain the fixed APs satisfying the condition in a way of real-time detection. Specifically, a signal detection device broadcasts a detection request message around and may learn that distances between which fixed AP and the current position of the vehicle is smaller than its own maximum transmission distances according to received response signal strength, namely the current position of the vehicle is within the signal coverage area, thus obtaining all the fixed APs satisfying the condition.

A scanning unit 330, configured to scan all the fixed APs satisfying the condition in one scheduling period.

Specifically, a scanning process by the scanning unit 330 is as follows: the scanning unit 330 successively sends a detection request message to all the fixed APs satisfying the condition acquired by the acquiring unit 330, and records a received RSSI of each fixed AP; and if a response signal of a certain AP is not received, a RSSI of the AP is recorded as zero.

A selecting unit 340, configured to select at least one fixed AP of which signal strength is greater than a preset value in all the fixed APs satisfying the condition as a to-be-accessed fixed AP, according to a scanning result of the scanning unit.

In an embodiment, after the scanning unit 330 scans all the fixed APs satisfying the condition once, the selecting unit 340 selects an AP with a largest RSSI as a to-be-accessed fixed AP; in another embodiment, after the scanning unit 330 scans all the fixed APs satisfying the condition once, the selecting unit 340 may sort RSSI values of all the fixed APs satisfying the condition from big to small, and select k (k is a positive integer) fixed APs of which RSSIs are greater than a preset value as to-be-accessed fixed APs.

Further, in another embodiment, the scanning unit 330 may scan all the fixed APs satisfying the condition for multiple times, such as three times, using multiple sub-timeslices in one scheduling period, and record an RSSI of each fixed AP in each scanning process. The selecting unit 340 selects an AP with a maximum average RSSI value (average of three times) as a to-be-accessed fixed AP after three times of scanning. It should be understood that in another embodiment, the scanning unit 330 may also select k (k>1) APs with maximum average RSSI values as to-be-accessed fixed APs.

A triggering unit 350, configured to trigger a mobile terminal in the vehicle to respectively access a vehicular AP in the vehicle and the to-be-accessed fixed AP in the scheduling period according to allocated time, when a preset access condition is satisfied.

In an embodiment, the access condition is that a speed is lower than a preset value. Specifically, it is assumed that a device name of an access AP selected by the selecting unit 340 is expressed as $AP_{best}$. The triggering unit 350 detects measurement information of a current speed provided by the GPS. If the current speed is smaller than a preset speed value VL (for example, VL=2 m/s), the triggering unit 350 broadcasts the device name $AP_{best}$ of the to-be-accessed fixed AP selected by the selecting unit 340 to a UE in the vehicle using one sub-timeslice (if the selecting unit 340 selects multiple to-be-accessed fixed APs, a device name list $AP_{best}$ of the selected multiple to-be-accessed fixed APs is broadcasted to the UE in the vehicle). After the UE on the bus receives the $AP_{best}$ broadcasted by the triggering unit 350, the UE respectively accesses the vehicular AP and the to-be-accessed fixed AP in the scheduling period according to the allocated time.

In another embodiment, the triggering unit 350 may trigger the UE in the vehicle to respectively access the vehicular AP and the to-be-accessed fixed AP in the scheduling period according to the time by taking a condition that signal strength of a data packet received by the vehicular AP is greater than a certain set strength value as an access condition. Specifically, it is assumed that a device name of the to-be-accessed fixed AP previously selected according to a scanning result is expressed as $AP_{best}$. Once the vehicular AP receives a data packet, the vehicular AP measures signal strength of the data packet. If the signal strength RSSI of the data packet is greater than a preset threshold $RSS_0$ (for example, $RSS_0$=−95 dbm), the triggering unit 350 broadcasts the device name $AP_{best}$ of the to-be-accessed fixed AP selected by the selecting unit 340 to the UE in the vehicle using one sub-timeslice. After the UE on the bus receives the $AP_{best}$ broadcasted by the triggering unit 350, the UE respectively accesses the vehicular AP and the to-be-accessed fixed AP in the scheduling period according to the allocated time.

Further, the vehicular communication device provided by an embodiment of the present invention further includes: a time calculating unit 360, configured to calculate the time allocated to the vehicular AP and the time allocated to the to-be-accessed fixed AP according to a preset scheduling strategy.

Specifically, when there is one to-be-accessed fixed AP, it is assumed that the vehicular AP is $AP_c$ and an AP in the $AP_{best}$ is $AP_g$, a method that the time calculating unit 360 calculates time in which the UE is connected to the $AP_c$ and the $AP_g$ is as follows.

In one scheduling period, it is assumed that the time allocated to the vehicular AP $AP_{best}$ is $f_c$ and the time allocated to the to-be-accessed fixed AP $AP_g$ is $f_g$. Scheduling formulae that the user is connected to the $AP_c$ and the $AP_g$ are:

$$f_c + f_g = 1 - 2d/D - \varepsilon \qquad \text{(Formula 3)}$$

$$\frac{f_g}{f_c} = (RSS_g - RSS_0)^\alpha \times \lambda \qquad \text{(Formula 4)}$$

Where, $\varepsilon$ is handover time in which the UE is handed over between different APs. Handover time of a UE is generally about 4 ms. $RSS_g$ is an RSSI of the $AP_g$. It should be noted that, in an embodiment, the RSSI of the to-be-accessed fixed AP $AP_g$ may be the one recorded by the scanning unit 330 in the scanning process; and in another embodiment, to acquire a current RSSI of the to-be-accessed fixed AP $AP_g$ more accurately so as to formulate a more accurate scheduling solution, a UE on the bus may actively scan an AP in the $AP_{best}$ using one sub-timeslice to acquire the current RSSI of the AP in the $AP_{best}$ after receiving the $AP_{best}$ broadcasted by the vehicular AP, and calculates the time allocated to the vehicular AP $AP_c$ and the to-be-accessed fixed AP $AP_g$ using the RSSI.

$RSS_0$ is a threshold value, and −95 dbm is suggested. If the $RSS_g$ is below the $RSS_0$ value, it is meant that the signal of the to-be-accessed fixed AP is very weak, and is not enough to keep high-speed connection. α is a system parameter for controlling whether more connection time is allocated to the fixed AP, and a value between 0.5 and 2 is suggested. λ is a weight having a value between 0 and 1 and may be dynamically adjusted according to the speed or signal strength of a data packet received by the vehicular AR For example, in an embodiment, the weight $$\lambda = \frac{V_L - V}{V_L},$$

where, V is a current running speed of the bus, $V_L$ is a set speed threshold having a typical value of 2 m/s. Thus, the value of the λ may be determined according to the speed, namely the lower the speed is, the larger the weight λ is, and when the speed is zero, namely the vehicle stops, the weight is maximum 1; when the speed V is equal to the $V_L$, a theoretical value of the weight λ is 0, but the weight does not have a practical significance, therefore, the λ may be assigned as a specific value under such a special situation, such as 0.01. It should be understood that, in another embodiment, the λ may also be determined according to signal strength of a data packet currently received by the vehicular AP, and the higher the signal strength of the data packet currently received by the vehicular AP is, the larger the λ is, and if the signal strength of the data packet currently received by the vehicular AP is 100%, the λ is 1.

It should be noted that one scheduling period is assumed as 400 ms in the embodiments of the present invention, the UE allocates the time to access the vehicular AP and the to-be-accessed fixed AP according to the time $f_c$ and $f_g$ calculated by the time calculating unit 360 in one scheduling period, and respectively accesses the vehicular AP and the to-be-accessed fixed AP in one scheduling period according to the allocated time.

The objective of allocating the time herein is that, a user allocates more time to connect the to-be-accessed fixed AP to increase the throughput when the bus is relatively close to the to-be-accessed fixed AP and the speed is relatively low; and when the bus starts running, the user starts moving away from the to-be-accessed fixed AP, the connection bandwidth with the AP declines, and the connection time with the AP is reduced at this moment, so that shorter interruption time (namely $f_c*D$) of the connection can be ensured when the user is disconnected from the AP.

In another example, when there are multiple to-be-accessed fixed APs, namely when the $AP_{best}$ includes k (k is a positive integer and k>1) APs, it is assumed that the k APs included in the $AP_{best}$ are successively $AP_{g_1}, AP_{g_2}, \ldots, AP_{g_k}$. The time calculating unit 360 calculates the formula 2 respectively for each of the to-be-accessed fixed APs in the $AP_{best}$, to obtain ratios $f_c:f_{g_1}, f_c:f_{g_2} \ldots f_c:f_{g_k}$ of the time allocated to the vehicular AP to the time allocated to the to-be-accessed fixed APs, and then calculates the time $f_c, f_{g_1}, f_{g_2} \ldots f_{g_k}$ allocated to the vehicular AP $AP_c$ and k to-be-accessed fixed APs $AP_{g_1}, AP_{g_2} \ldots AP_{g_k}$ in one scheduling period according to the formula 3. In one scheduling period, the UE respectively accesses the vehicular AP and the to-be-accessed fixed APs according to the time calculated by the time calculating unit 360.

Through the above technical solutions in the embodiments of the present invention, a fixed AP with relatively high signal strength is selected by scanning fixed APs nearby a vehicle during the running of the vehicle, and a UE in the vehicle is triggered to access a vehicular AP and the selected fixed AP with relatively high signal strength according to allocated time when an access condition is satisfied. Because the fixed AP can provide a higher data transmission rate compared to the vehicular AP, the communication bandwidth of the user in the vehicle can be increased to support bulk data service.

Figure 4:
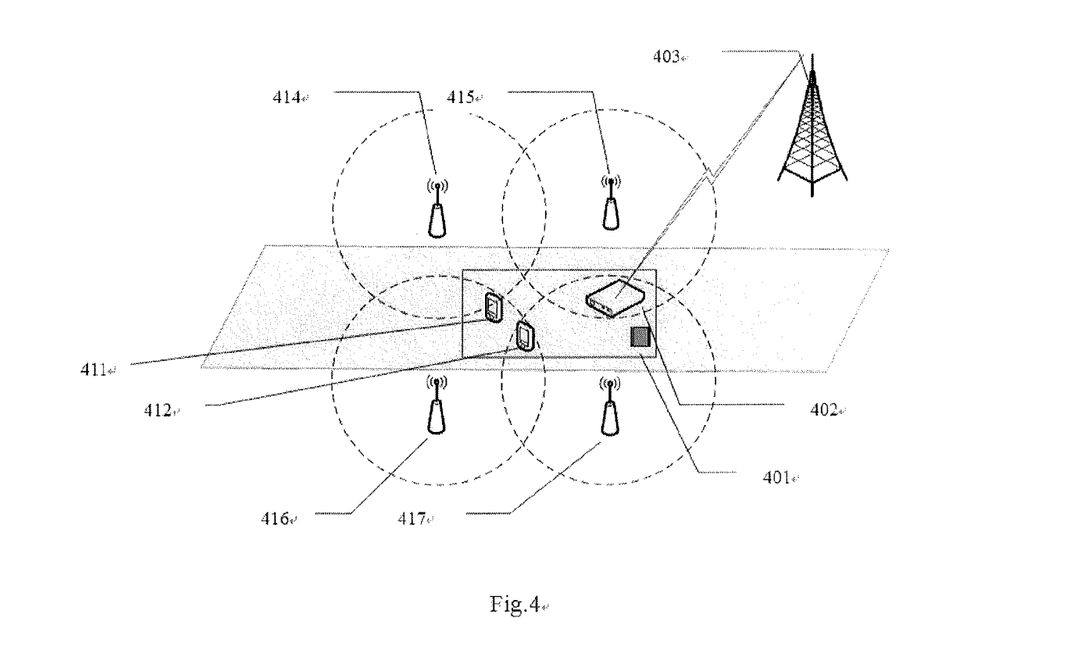
FIG. 4 is a structural diagram of a vehicular communication system provided by an embodiment of the present invention.

As shown in FIG. 4, an embodiment of the present invention provides a vehicular communication system, including a vehicular communication device 401 and a vehicular AP 402.

The vehicular communication device 401 is configured to: acquire a current position of a vehicle; acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance; scan all the fixed APs satisfying the condition in a scheduling period; select at least one fixed AP of which signal strength is greater than a preset value in all the fixed APs satisfying the condition as a to-be-accessed fixed AP according to a scanning result; and trigger a mobile terminal in the vehicle to respectively access the vehicular AP 402 and the to-be-accessed fixed AP in the scheduling period according to allocated time, when a preset access condition is satisfied.

The solutions of the embodiments of the present invention will be further illustrated below in conjunction with a specific scenario.

Specifically, as shown in FIG. 4, it is assumed that the fixed APs satisfying the condition, acquired by the vehicular AP 402 according to the current position of the vehicle, are 414 to 416 in FIG. 4; and the vehicular AP 402 supports a wireless access technology, which is described by using a WCDMA access technology as an example in the embodiment of the present invention. It is should be understood for those skilled in the art that the wireless access technology is not limited to the WCDMA, and other access manners may be adopted, such as IEEE 802.11n. There are multiple mobile terminals (such as 411 and 412 in FIG. 4) in the vehicle, and the vehicular AP 402 is connected with the mobile terminals 411 and 412 using a WCDMA frequency band 1, and performs backhaul access using a WCDMA frequency band 2 to be connected with a micro base station 403.

The vehicular communication device 401 scans the fixed APs 414-416 in one scheduling period, selects at least one fixed AP of which signal strength is greater than a preset value in the fixed APs as a to-be-accessed fixed AP (assuming 416 in FIG. 4) according to a scanning result, and triggers the mobile terminals 411 and 412 to respectively access the vehicular AP 402 and the to-be-accessed fixed AP 416 in the scheduling period according to allocated time when an access condition is satisfied.

In an embodiment, after the vehicular communication device 401 scans the fixed APs 414-416 once, a fixed AP with a largest RSSI may be selected as a to-be-accessed fixed AP; or RSSI values of the fixed APs 414-416 may also be sorted from big to small, and an AP of which an RSSI is greater than a preset value is selected as a to-be-accessed fixed AP.

In an embodiment, the vehicular communication device 401 triggers the mobile terminals 411 and 412 to respectively access the vehicular AP 402 and the to-be-accessed fixed AP 416 in the scheduling period according to the allocated time by taking a condition that a current speed is lower than a preset speed value as an access condition. Specifically, it is assumed that the vehicular communication device 401 detects measurement information of a current speed provided by a GPS. If the current speed is smaller than a preset speed value VL (for example, VL=2 m/s), the vehicular communication device 401 broadcasts a device name of the selected to-be-accessed fixed AP 416 to the mobile terminals 411 and 412 in the vehicle using one sub-timeslice. After the mobile terminals 411 and 412 receive the broadcast of the vehicular communication device 401, the mobile terminals 411 and 412 access respectively the vehicular AP 402 and the to-be-accessed fixed AP 416 in the scheduling period according to the allocated time. The allocated time has been described in detail in the step 103 of the embodiment of the present invention, which will not be described redundantly herein.

In another embodiment, the vehicular communication device 401 triggers the mobile terminals 411 and 412 to respectively access the vehicular AP 402 and the to-be-accessed fixed AP 416 in the scheduling period according to the allocated time by taking a condition that signal strength of a data packet received by the vehicular AP 402 is greater than a preset strength value as an access condition. Specifically, it is assumed that a device name of the to-be-accessed fixed AP previously selected according to a scanning result is expressed as $AP_{best}$. Once the vehicular AP 402 receives a data packet, the vehicular AP 402 measures signal strength of the data packet. If the signal strength RSSI of the data packet is greater than a preset strength value $RSS_0$ (for example, $RSS_0$=−95 dbm), the vehicular communication device 401 broadcasts the device name of the selected to-be-accessed fixed AP 416 to the mobile terminals 411 and 412 in the vehicle using one sub-timeslice. After the mobile terminals 411 and 412 receives the broadcast of the vehicular communication device 401, the mobile terminals 411 and 412 respectively access the vehicular AP 402 and the to-be-accessed fixed AP 416 in the scheduling period according to the allocated time. The allocated time has been described in detail in the step 103 of the embodiment of the present invention, which will not be described redundantly herein.

Through the above technical solutions in the embodiments of the present invention, a fixed AP with a relatively high signal strength is selected by scanning fixed APs nearby a vehicle during the running of the vehicle, and a UE in the vehicle is triggered to access a vehicular AP and the selected fixed APs with relatively high signal strength according to allocated time when an access condition is satisfied. Because the fixed AP can provide a higher data transmission rate compared to the vehicular AP, the communication bandwidth of the user in the vehicle may be increased to support bulk data service.

In the end, it should be noted that the preceding embodiments are only used for illustrating the technical solutions of the present invention, rather than limiting the present invention; though the present invention is illustrated in detail with reference to the preceding embodiments, it should be understood by those skilled in the art that modifications may still be made to the technical solutions disclosed in the preceding embodiments, or equivalent substitutions may be made to a part of technical characteristics thereof; and these modifications or substitutions do not make the nature of corresponding technical solutions depart from the scope of the technical solutions of the respective embodiments of the present invention.

What is claimed is:

1. A vehicular communication method, comprising:
   acquiring a current position of a vehicle;
   acquiring all fixed access points (AP) satisfying a condition outside the vehicle according to the current position of the vehicle, wherein the fixed AP satisfying the condition is the one, the distance from which to the current position of the vehicle is smaller than the fixed AP's own maximum transmission distance;
   scanning all the fixed APs satisfying the condition in a scheduling period;
   selecting at least one fixed AP of which signal strength is greater than a preset value in all the fixed APs satisfying the condition as a to-be-accessed fixed AP, according to a scanning result;
   triggering a mobile terminal in the vehicle to respectively access a vehicular AP in the vehicle and the to-be-accessed fixed AP in the scheduling period according to allocated time, when a preset access condition is satisfied;
   before the mobile terminal in the vehicle respectively accesses the vehicular AP and the to-be-accessed fixed AP in the scheduling period according to the allocated time, the method further comprises: calculating time allocated to the vehicular AP in the vehicle and time allocated to the to-be-accessed fixed AP according to a preset scheduling strategy;
   wherein there is one to-be-accessed fixed AP, and the calculating time allocated to the vehicular AP and time allocated to the to-be-accessed fixed AP according to a preset scheduling strategy comprises:
   calculating the time allocated to the vehicular AP and the time allocated to the to-be-accessed fixed AP according to formulae $f_c+f_g=1-t$ and $$\frac{f_g}{f_c} = (RSS_g - RSS_0)^\alpha \times \lambda;$$

where, t is the sum of broadcasting time in which the to-be-accessed fixed AP is broadcasted to the mobile terminal, scanning time in which the fixed APs satisfying the condition are scanned and handover time in which the mobile terminal is handed over between different APs, $f_c$ is the time allocated to the vehicular AP, $f_g$ is the time allocated to the to-be-accessed fixed AP, $RSS_g$ is received signal strength (RSSI) of the to-be-accessed fixed AP, $RSS_0$ is a set threshold value of signal strength, $\alpha$ is a system parameter and $\lambda$ is a weight having a value between 0 and 1.

2. The method of claim 1, wherein after the acquiring the current position of the vehicle, the method further comprises: acquiring a speed of the vehicle; and the access condition is that the speed of the vehicle is lower than a preset speed value.

3. The method of claim 1, wherein the method further comprises: acquiring signal strength of a data packet received by the vehicular AP in the vehicle; and the access condition is that the signal strength of the data packet received by the vehicular AP in the vehicle is greater than a preset strength value.

4. The method of claim 1, wherein t=2d/D+ϵ;
where, D is the scheduling period, d is a length of each sub-timeslice after the D is divided into a plurality of sub-timeslices, ϵ is handover time in which the terminal is handed over between different APs, α is the system parameter having a value between 0.5 and 2, and the weight can be dynamically adjusted according to a speed of the vehicle or signal strength of a data packet received by the vehicular AP.

5. The method of claim 1, wherein the maximum transmission distance is 50 m, 100 m or 200 m.

6. A vehicular communication device, comprising:
a first acquiring unit, configured to acquire a current position of a vehicle;
a second acquiring unit, configured to acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
a scanning unit, configured to scan all the fixed APs satisfying the condition in a scheduling period;
a selecting unit, configured to select at least one fixed AP of which signal strength is greater than a preset value in all the fixed APs satisfying the condition as a to-be-accessed fixed AP, according to a scanning result;
a triggering unit, configured to trigger a mobile terminal in the vehicle to respectively access a vehicular AP in the vehicle and the to-be-accessed fixed AP in the scheduling period according to allocated time, when a preset access condition is satisfied;
a time calculating unit, configured to calculate time allocated to the vehicular AP and time allocated to the to-be-accessed fixed AP according to a preset scheduling strategy;
wherein there is one to-be-accessed fixed AP, the time calculating unit is further configured to:
calculate the time allocated to the vehicular AP and the time allocated to the to-be-accessed fixed AP according to formulae $f_c+f_g=1-t$ and $$\frac{f_g}{f_c} = (RSS_g - RSS_0)^\alpha \times \lambda;$$

where, t is the sum of broadcasting time in which the to-be-accessed fixed AP is broadcasted to the mobile terminal, scanning time in which the fixed APs satisfying the condition are scanned and handover time in which the mobile terminal is handed over between different APs, $f_c$ is the time allocated to the vehicular AP, $f_g$ is the time allocated to the to-be-accessed fixed AP, $RSS_g$ is received signal strength (RSSI) of the to-be-accessed fixed AP, $RSS_0$ is a set threshold value of signal strength, α is a system parameter and λ is a weight having a value between 0 and 1.

7. The device of claim 6, wherein the first acquiring module is configured to acquire a speed of the vehicle; and the triggering unit is configured to trigger the mobile terminal in the vehicle to respectively access the vehicular AP in the vehicle and the to-be-accessed fixed AP in the scheduling period according to the allocated time when the speed of the vehicle is lower than a preset speed value.

8. The device of claim 6, wherein the first acquiring module is configured to acquire signal strength of a data packet received by the vehicular AP in the vehicle; and the triggering unit is configured to trigger the mobile terminal in the vehicle to respectively access the vehicular AP in the vehicle and the to-be-accessed fixed AP in the scheduling period according to the allocated time when the signal strength of the data packet received by the vehicular AP in the vehicle is greater than a preset strength value.

9. The device of claim 6, further comprising:
a time calculating unit, configured to calculate time allocated to the vehicular AP and time allocated to the to-be-accessed fixed AP according to a preset scheduling strategy.

10. A vehicular communication system, comprising a vehicular communication device and a vehicular access point (AP) which are arranged in a vehicle; wherein,
the vehicular communication device is configured to:
acquire a current position of the vehicle;
acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
scan all the fixed APs satisfying the condition in a scheduling period; select at least one fixed AP of which signal strength is greater than a preset value in all the fixed APs satisfying the condition as a to-be-accessed fixed AP, according to a scanning result;
trigger a mobile terminal in the vehicle to respectively access the vehicular AP and the to-be-accessed fixed AP in the scheduling period according to allocated time, when a preset access condition is satisfied;
before the mobile terminal in the vehicle respectively accesses the vehicular AP and the to-be-accessed fixed AP in the scheduling period according to the allocated time, the vehicular communication device is configured to: calculate time allocated to the vehicular AP in the vehicle and time allocated to the to-be-accessed fixed AP according to a preset scheduling strategy;
wherein there is one to-be-accessed fixed AP, and the vehicular communication device is configured to:
calculate the time allocated to the vehicular AP and the time allocated to the to-be-accessed fixed AP according to formulae $f_c+f_g=1-t$ and $$\frac{f_g}{f_c} = (RSS_g - RSS_0)^\alpha \times \lambda;$$

where, t is the sum of broadcasting time in which the to-be-accessed fixed AP is broadcasted to the mobile terminal, scanning time in which the fixed APs satisfying the condition are scanned and handover time in which the mobile terminal is handed over between different APs, $f_c$ is the time allocated to the vehicular AP, $f_g$ is the time allocated to the to-be-accessed fixed AP, $RSS_g$ is received signal strength (RSSI) of the to-be-accessed fixed AP, $RSS_0$ is a set threshold value of signal strength, α is a system parameter and λ is a weight having a value between 0 and 1.

11. The system of claim 10, wherein the vehicular communication device is configured to acquire a speed of the vehicle; and the access condition is that the speed of the vehicle is lower than a preset speed value.

12. The system of claim 10, wherein the vehicular communication device is configured to acquire signal strength of a data packet received by the vehicular AP in the vehicle; and the access condition is that the signal strength of the data packet received by the vehicular AP is greater than a preset strength value.

13. A vehicular communication method, comprising:
acquiring a current position of a vehicle;
acquiring all fixed access points (AP) satisfying a condition outside the vehicle according to the current position of the vehicle, wherein the fixed AP satisfying the condition is the one, the distance from which to the current position of the vehicle is smaller than the fixed AP's own maximum transmission distance;
scanning all the fixed APs satisfying the condition in a scheduling period;
selecting at least one fixed AP of which signal strength is greater than a preset value in all the fixed APs satisfying the condition as a to-be-accessed fixed AP, according to a scanning result;
triggering a mobile terminal in the vehicle to respectively access a vehicular AP in the vehicle and the to-be-accessed fixed AP in the scheduling period according to allocated time, when a preset access condition is satisfied;
before the mobile terminal in the vehicle respectively accesses the vehicular AP and the to-be-accessed fixed AP in the scheduling period according to the allocated time, the method further comprises: calculating time allocated to the vehicular AP in the vehicle and time allocated to the to-be-accessed fixed AP according to a preset scheduling strategy;
wherein there are a plurality of to-be-accessed fixed APs, and the calculating time allocated to the vehicular AP and time allocated to the to-be-accessed fixed APs according to a preset scheduling strategy comprises:
for each to-be-accessed fixed AP in the plurality of to-be-accessed fixed APs, calculating a time ratio of the time allocated to the vehicular AP to time allocated to each to-be-accessed fixed AP respectively according to a formula $$\frac{f_g}{f_c} = (RSS_g - RSS_0)^\alpha \times \lambda;$$

calculating the time allocated to the vehicular AP and the time allocated to each to-be-accessed fixed AP according to a formula $$f_c + \sum_{i=1}^{k} f_{gi} = 1 - t$$

based on the time ratios;
where, t is the sum of broadcasting time in which the to-be-accessed fixed AP is broadcasted to the mobile terminal, scanning time in which the fixed APs satisfying the condition are scanned and handover time in which the mobile terminal is handed over between different APs, k is the number of the plurality of to-be-accessed fixed APs, $f_c$ is the time allocated to the vehicular AP, $f_{gi}$ is the time allocated to the ith fixed access AP in the multiple to-be-accessed fixed APs, $RSS_g$ is received signal strength RSSI of the to-be-accessed fixed AP, $RSS_0$ is a set signal strength threshold value, $\alpha$ is a system parameter, and $\lambda$ is a weight having a value between 0 and 1.

14. The method of claim 13, wherein t=2d/D+ϵ;
where, D is the scheduling period, d is a length of each sub-timeslice after the D is divided into a plurality of sub-timeslices, ϵ is handover time in which the terminal is handed over between different APs, $\alpha$ is the system parameter having a value between 0.5 and 2, and the weight can be dynamically adjusted according to speed of the vehicle or signal strength of a data packet received by the vehicular AP.

15. A vehicular communication device, comprising:
a first acquiring unit, configured to acquire a current position of a vehicle;
a second acquiring unit, configured to acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
a scanning unit, configured to scan all the fixed APs satisfying the condition in a scheduling period;
a selecting unit, configured to select at least one fixed AP of which signal strength is greater than a preset value in all the fixed APs satisfying the condition as a to-be-accessed fixed AP, according to a scanning result;
a triggering unit, configured to trigger a mobile terminal in the vehicle to respectively access a vehicular AP in the vehicle and the to-be-accessed fixed AP in the scheduling period according to allocated time, when a preset access condition is satisfied;
a time calculating unit, configured to calculate time allocated to the vehicular AP and time allocated to the to-be-accessed fixed AP according to a preset scheduling strategy;
wherein there are a plurality of to-be-accessed fixed APs, the time calculating unit is further configured to:
for each to-be-accessed fixed AP in the plurality of to-be-accessed fixed APs, calculate a time ratio of the time allocated to the vehicular AP to time allocated to each to-be-accessed fixed AP respectively according to a formula $$\frac{f_g}{f_c} = (RSS_g - RSS_0)^\alpha \times \lambda;$$

calculate the time allocated to the vehicular AP and the time allocated to each to-be-accessed fixed AP according to a formula $$f_c + \sum_{i=1}^{k} f_{gi} = 1 - t$$

based on the time ratios;
where, t is the sum of broadcasting time in which the to-be-accessed fixed AP is broadcasted to the mobile terminal, scanning time in which the fixed APs satisfying the condition are scanned and handover time in which the mobile terminal is handed over between different APs, k is the number of the plurality of to-be-accessed fixed APs, $f_c$ is the time allocated to the vehicular AP, $f_{gi}$ is the time allocated to the ith fixed access AP in the multiple to-be-accessed fixed APs, $RSS_g$ is received signal strength RSSI of the to-be-accessed fixed AP, $RSS_0$ is a set signal strength threshold value, $\alpha$ is a system parameter and $\lambda$ is a weight having a value between 0 and 1.

16. A vehicular communication system, comprising a vehicular communication device and a vehicular access point (AP) which are arranged in a vehicle; wherein,
the vehicular communication device is configured to:
acquire a current position of the vehicle;
acquire all fixed APs satisfying a condition outside the vehicle according to the current position of the vehicle, wherein the fixed AP satisfying the condition is the one, the distance from which to the current position of the vehicle is smaller than the fixed AP's own maximum transmission distance;
scan all the fixed APs satisfying the condition in a scheduling period; select at least one fixed AP of which signal strength is greater than a preset value in all the fixed APs satisfying the condition as a to-be-accessed fixed AP, according to a scanning result;
trigger a mobile terminal in the vehicle to respectively access the vehicular AP and the to-be-accessed fixed AP in the scheduling period according to allocated time, when a preset access condition is satisfied;
before the mobile terminal in the vehicle respectively accesses the vehicular AP and the to-be-accessed fixed AP in the scheduling period according to the allocated time, the vehicular communication device is configured to: calculate time allocated to the vehicular AP in the vehicle and time allocated to the to-be-accessed fixed AP according to a preset scheduling strategy;
wherein there are a plurality of to-be-accessed fixed APs, the vehicular communication device is configured to:
for each to-be-accessed fixed AP in the plurality of to-be-accessed fixed APs, calculate a time ratio of the time allocated to the vehicular AP to time allocated to each to-be-accessed fixed AP respectively according to a formula $$\frac{f_g}{f_c} = (RSS_g - RSS_0)^\alpha \times \lambda;$$

calculate the time allocated to the vehicular AP and the time allocated to each to-be-accessed fixed AP according to a formula $$f_c + \sum_{i=1}^{k} f_{gi} = 1 - t$$

based on the time ratios;
where, t is the sum of broadcasting time in which the to-be-accessed fixed AP is broadcasted to the mobile terminal, scanning time in which the fixed APs satisfying the condition are scanned and handover time in which the mobile terminal is handed over between different APs, k is the number of the plurality of to-be-accessed fixed APs, $f_c$ is the time allocated to the vehicular AP, $f_{gi}$ is the time allocated to the ith fixed access AP in the multiple to-be-accessed fixed APs, $RSS_g$, is received signal strength RSSI of the to-be-accessed fixed AP, $RSS_0$ is a set signal strength threshold value, $\alpha$ is a system parameter and $\lambda$ is a weight having a value between 0 and 1.

* * * * *

UNITED STATES PATENT AND TRADEMARK OFFICE
CERTIFICATE OF CORRECTION

PATENT NO. : 9,479,999 B2  
APPLICATION NO. : 14/309444  
DATED : October 25, 2016  
INVENTOR(S) : Zhang et al.

Page 1 of 1

It is certified that error appears in the above-identified patent and that said Letters Patent is hereby corrected as shown below:

On the Title Page

Left column, item (72), after "Jun Zhang," replace "Kowloon" with --Hongkong--.

Left column, item (72), after "Jiannong Cao," replace "Kowloon" with --Hongkong--.

Signed and Sealed this  
Tenth Day of April, 2018

Andrei Iancu  
*Director of the United States Patent and Trademark Office*